United States Patent [19]
Pronesti

[11] Patent Number: 5,598,232
[45] Date of Patent: Jan. 28, 1997

[54] BIFOCAL-COMPENSATING EYEGLASS ATTACHMENT

[76] Inventor: George R. Pronesti, P.O. Box #203, Bryn Athyn, Pa. 19009

[21] Appl. No.: 603,437

[22] Filed: Feb. 20, 1996

[51] Int. Cl.⁶ .............................. G02C 7/06; G02C 7/08
[52] U.S. Cl. ............................ 351/54; 351/55; 351/57
[58] Field of Search ............................ 351/54, 55, 47, 351/57, 44, 41, 158, 61

[56] References Cited

U.S. PATENT DOCUMENTS

| | | | |
|---|---|---|---|
| 0,712,616 | 11/1902 | Strassburger | 351/57 |
| 1,206,457 | 11/1916 | Mills | 351/57 |
| 2,326,787 | 8/1943 | Lorig | 351/57 |
| 5,056,906 | 10/1991 | Akiyoshi | 351/57 |
| 5,243,366 | 9/1993 | Blevins | 351/57 |

*Primary Examiner*—Hung Dang
*Attorney, Agent, or Firm*—Leydig, Voit & Mayer

[57] ABSTRACT

An attachment for bifocal eyeglasses including at least one eyeglass lens having a first correcting region providing corrected distant-vision and a second correcting region providing corrected near-vision, the attachment including a compensating lens sized and shaped for covering the second correcting region of the eyeglass lens without substantially covering the first correcting region of the eyeglass lens and providing optical compensation for the second correcting region so that corrected distant-vision is provided over substantially all of the first and second regions of the eyeglass lens; and an attachment for attaching the compensating lens to the eyeglasses.

16 Claims, 3 Drawing Sheets

BIFOCAL-COMPENSATING EYEGLASS ATTACHMENT

FIELD OF THE INVENTION

This invention pertains to an attachment for bifocal eyeglasses compensating for the region of a lens providing corrected near-vision so that distance corrected vision is achieved over all of the area of the bifocal lens.

BACKGROUND OF THE INVENTION

Multiple focus eyeglasses have been in common use for many years. The most prevalent version of multiple focus eyeglasses are bifocals in which one or both lenses include distinct regions providing vision corrections for forming focused images of objects at two distinct locations. In a typical bifocal lens, a first region provides a vision correction so that distant objects are observed in focus. In a second region of the bifocal lens, a different correcting region is provided for viewing near images, for example, during reading. Eyeglasses with multiple focus lenses are handy because objects at different distances can be viewed in focus using the different correcting regions of the lenses without changing between separate pairs of distant-vision and near-vision eyeglasses.

Although, in many instances, bifocals can be particularly useful, in some situations they can present an impediment to achieving some visual goal. Typically, the near-vision correction for reading is at the lower part of the lens and when it is desired to view a distant object looking downward, i.e., through the near-vision correcting region of the lens, some physical adjustment in head or eye position must be made in order to see the desired object in focus. Thus, certain activities, such as hunting and golfing, present dilemmas for those persons who wear bifocal lenses. For example, in hunting, when it is desired to view a distant target along a gun sight, the near-vision part of the bifocal lens is typically in the line of vision preventing accurate sighting. In golfing, when preparing to hit a teed ball or when taking other strokes, it is desirable to keep the head down. In that posture, it is difficult or impossible to view the ball through the distant-vision part of bifocal and, therefore, a golfer wearing bifocals has a tendency to change head position before and during his swing with a detrimental effect on the drive.

One solution to the problem of attempting to view distant objects through the near correction region of a bifocal lens, other than adjusting the head position, is the provision of two pairs of glasses, one for near-vision viewing and one for distant-vision viewing. However, in activities such as golfing and hunting, it is necessary to carry out some activities while viewing near objects, e.g., selecting a club, inspecting a ball, and the like, or loading ammunition, cleaning a firearm or the like, and other activities while viewing distant objects, making repeated glasses changing a nuisance. Moreover, carrying of an additional pair or pairs of glasses can be annoying during sporting activities.

Accordingly, it is desirable to provide some way of switching between conventional bifocal vision and distant-vision over all of an eyeglass lens viewing area without the necessity of changing glasses.

SUMMARY OF THE INVENTION

It is an object of the invention to provide an attachment for eyeglasses in which the near-vision correcting region of a bifocal lens can be readily and selectively converted to a distant-vision correction and similarly restored to a near-vision correction.

It is a further object of the invention to provide an inexpensive eyeglass attachment for selectively and easily changing a near-vision correction of a bifocal lens to a distant-vision correction without substantial modification of the eyeglasses.

An attachment for bifocal eyeglasses according to the invention includes at least one eyeglass lens having a first correcting region providing corrected distant-vision and a second correcting region providing corrected near-vision, a compensating lens sized and shaped for covering the second correcting region of the eyeglass lens without substantially covering the first correcting region of the eyeglass lens and providing optical compensation for the second correction region so that corrected distant-vision is provided over substantially all of the first and second regions of the eyeglass lens and means for attaching the compensating lens to the eyeglasses.

An attachment according to the invention may include hooks engaging the bridge or temples of eyeglass frames and, most preferably, includes a hinge for rotating the compensating lens to a use position in front of the eyeglass lens and for rotating the compensating lens away from the eyeglass lens to a storage position. Further, more preferably, the hinge includes a detent for releasably retaining the compensating lens in selected positions. Further, an attachment according to the invention includes a lens connected by a bendable support to an eyeglass attachment element for adjustment of the lens to cover the near-vision correcting region of the eyeglass lens accurately. Most preferable, the attachment includes as many compensating lenses as there are bifocal lenses in the eyeglasses. Further, according to another embodiment of the invention, the attachment may be permanently attached to the eyeglass frames.

BRIEF DESCRIPTION OF THE DRAWINGS

In all figures, the same references numerals indicate the same elements.

DESCRIPTION OF PREFERRED EMBODIMENTS

Figure 1A:
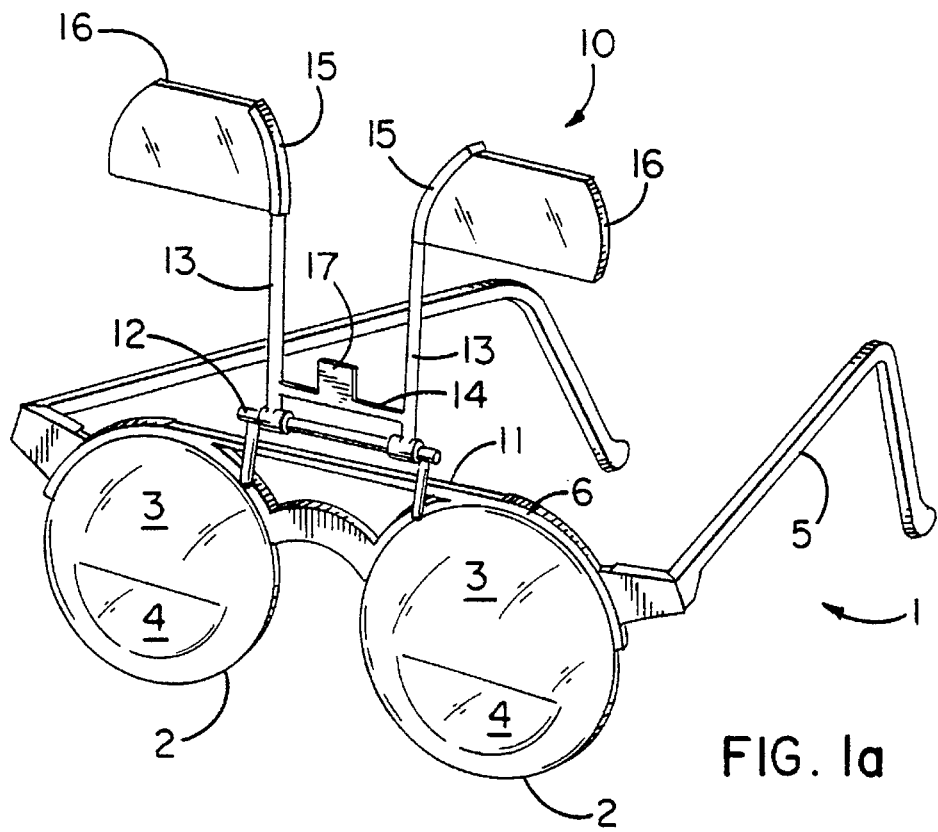
FIGS. 1a and 1b are perspective views showing an embodiment of a bifocal-compensating eyeglass attachment in storage and use positions, respectively.
Figure 1B:
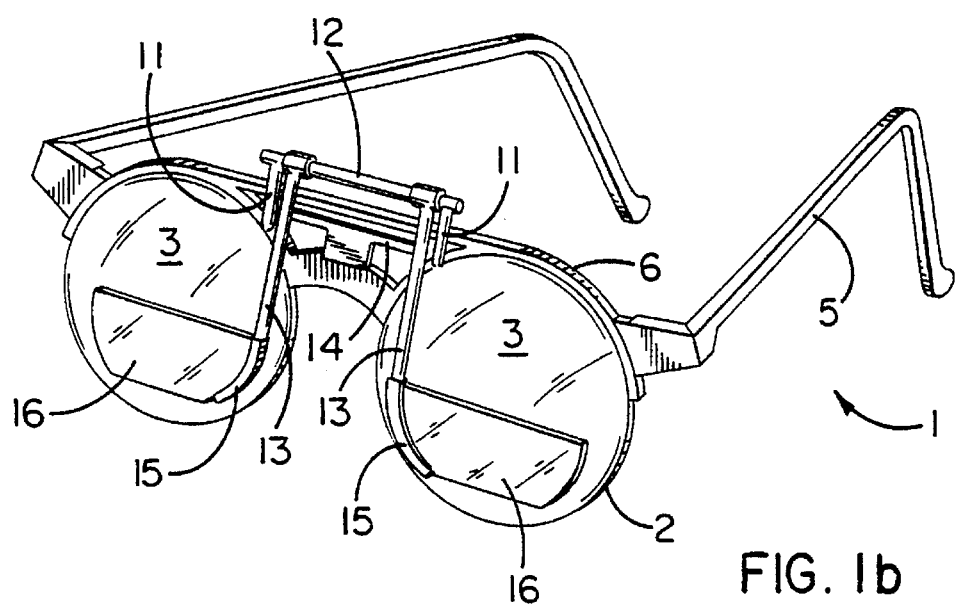

FIGS. 1a and 1b show a pair of eyeglasses 1 with a bifocal-compensating eyeglass attachment according to an embodiment of the invention attached to the eyeglasses. In FIG. 1a, the compensating attachment is shown in a storage position and in FIG. 1b, the compensating attachment is shown in the use position. In these figures, the conventional eyeglasses 1 include two correcting lenses 2, each of which is a bifocal lens. Each bifocal lens 2 includes a first correcting region 3 providing corrected distant-vision and a second correcting region 4 providing corrected near or reading vision. As is conventional with bifocal lenses, each correcting region has a particular prescription, generally expressed in diopter units. Although like numbers are given to each of the correcting regions in each of the two lenses, ordinarily the distant and near corrections for each lens are different. The eyeglasses 1 include side portions, i.e., temples, 5 and a bridge 6 that provides support for the lenses 2.

The bifocal-compensating eyeglass attachment 10 includes a pair of attaching structures 11, generally in the shape of hooks, that mount the attachment 10 on the bridge 6 of the eyeglass frames. Most preferably, two attaching structures are provided. An axle 12 extends parallel to the lenses 2 and is mounted on the attaching structures 11. A rotatable frame including compensating lens-supporting elements 13 and, preferably, a bridging member 14 is rotatingly mounted on the axle 12, forming a hinge. A compensating lens mounting member 15 is attached at the end of each of the lens-supporting elements 13 and a compensating lens 16 is attached to each of the compensating lens mounting elements 15.

In the view of FIG. 1a, the compensating lenses 16 are out of the line of view of the wearer of the eyeglasses 1, i.e., are stored. In the view of FIG. 1b, the rotatable frame has been rotated about the axle 12 so that the compensating lenses 16 are placed adjacent respective near-vision correcting regions 4 of the lenses 2.

Preferably, the sizes and shapes of the compensating lenses 16 are substantially the same as those of the corresponding near-vision correcting regions 4. Most preferably, the compensating lenses are aligned to cover those corresponding near-vision correcting regions as accurately as possible without covering substantially any part of the corresponding distant-vision correcting region 3. Conventionally, the refracting powers of the near-vision correcting regions 4 are larger than the refracting powers of the first correcting regions 3 that correct images of distant objects. For example, in diopters, a typical distant-vision correction for hyperopia is +4 with an additional correction of +2 diopters for the near-vision correction. The compensating lens 16 has a refracting power opposite that of the near-vision correcting region 4 that the lens 16 changes, sufficient to reduce the refracting power of the near-vision correction region to that of the distant-vision correcting regions 3. For instance, in the foregoing example, the compensating lens 16 has a power of −2 diopters. Thus, the net correction of a near-vision correcting region 4 and the compensating lens 16 is +4 diopters, the same power as the distant-vision correcting region 3. Therefore, when a compensating lens 16 is placed in front of and adjacent a corresponding near-vision correcting region, the same refracting power, the refracting power of the distant-vision correcting region 3, is produced over all the area of the lens 2. In other words, the entire lens 2 functions as if it were a distant-vision correcting lens only. Although the specific example pertains to only one correcting lens and compensating lens pair, just as each of the lenses 2 typically has a different refracting power, so the compensating lenses 16 is usually of different powers, chosen so that the respective near-vision corrections are compensated to the desired distant-vision corrections for each of the lenses 2.

In situations where a person who normally wears bifocal glasses wishes to dispense with the near-vision correction, retaining over the entire field of view the distance vision correction, that result is easily achieved by swinging the rotatable frame to place the compensating lenses 16 in front of the near-vision correcting regions 4. Thus, a golfer can tee off while viewing the ball in focus without having to adjust his head to a particular posture to enable a clear view of the ball. Likewise, a hunter can sight a target without changing glasses or adopting an awkward head position. When those golfing, hunting, and like activities are completed, the compensating lenses 16 can be swung out of the way to the storage position without changing eyeglasses to restore the desired bifocal vision for other activities, such as keeping score and loading ammunition. When these vision options are no longer desired, the compensating attachment can be removed from the glasses by detaching the attaching structures 11 from the bridge 6.

The lens mounting members 15 for mounting the compensating lenses 16 are entirely conventional. Those mounting members may employ an adhesive or rivets, for example, as typically used with rimless or thin metal frame glasses commonly available so as not to unduly obscure the vision of the wearer of the eyeglasses 1 with the compensating lenses are in the use position. Likewise, the compensating lens supporting elements 13 of the rotatable frame are shown, for simplicity, in FIGS. 1a and 1b as linear elements. Those elements may be wires, rods, or tubes that have a sinuous region around the nose piece of the eyeglass frames to minimize obscuring of the lenses 2. Those supporting elements 13 may be resilient, e.g. plastic, or, preferably, are bendable in order to permit precise adjustment of the compensating lenses 16 for placement directly opposite the near-vision correcting regions 4. The bridging member 14 of the rotatable frame is an optional stabilizing strut that may optionally include a tab 17, shown only in FIG. 1a, that may be grasped with a finger and/or fingernail in order to aid in the rotation of the frame while moving the compensating lenses 16 between the storage and use positions.

The invention provides important advantages over the prior art. The invention is directly usable with existing bifocal eyeglasses that the user conventionally wears. An inverse arrangement in which a pair of distant-vision eyeglasses are fitted with an attachment including "flip-down" lenses providing near-vision or bifocal viewing is undesirable because a second pair of eyeglasses (distant-vision only) is required, the user still has to change eyeglasses to his conventional bifocals after use of the single vision eyeglasses, and the more common viewing arrangement requires the use of additional lenses, the less desirable of the two viewing options.

The attaching structures 11 and the mechanism for moving the compensating lenses between stored and use positions may employ any known structures serving those functions. For example, structures similar to conventionally available detachable sunglasses for use with eyeglasses may be employed. The axle 12 may be part of the rotatable frame and the attaching structures 4 may include a barrel or groove receiving the axle. The frictional engagement of the axle and barrel or groove may be sufficient to retain the compensating lenses in storage and use positions in spite of head movement by the wearer of the eyeglasses. However, because of the weight of the compensating lenses and, for convenience, most preferably, the attaching structures and the mechanism providing rotational movement of the frame include a detent or other releasable means for releasably holding the compensating eyeglass attachment in the storage and use positions. The particular axle and rotating barrel arrangement of the embodiment of FIG. 1a is further illustrated in FIG. 2b. As seen there, the compensation lens supporting element 13 extends from a barrel 18 through which the axle 11 passes.

Figure 2A:
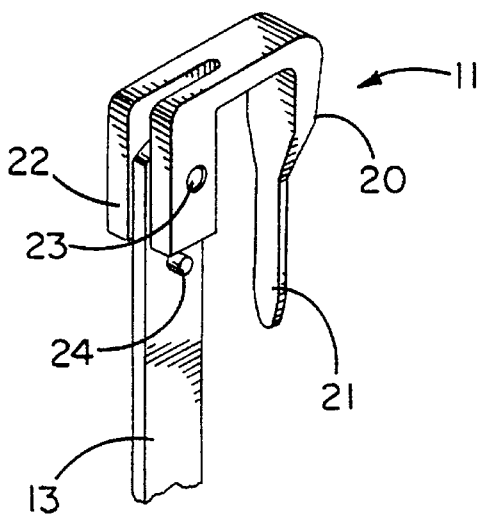
FIGS. 2a and 2b are detail drawings showing a hinge arrangement that may be used in embodiments of the invention.

FIG. 2a schematically illustrates one embodiment of an attaching structure 11. That attaching structure includes a hook 20 having an extending end 21 that is preferably resilient so that the bridge 6 of the eyeglass frame, possibly including a portion of a lens 2, is grasped securely by the hook 20. The resilience of the end 21 aids in attachment and detachment of the hook 20 as well as the grasping function. The hook 20 may be lined or coated with a resilient material, such as a plastic foam or sleeve (not shown), in order to increase the gripping power and frictional force of the hook 20. The side 22 of the hook 20 opposite the end 21 includes a clevis, the slot of which receives a compensating lens-supporting element 13. A pin 23 passes through the clevis and the lens-supporting member 13 so that the lens-supporting member 13 can rotate relative to the hook 20. A resilient stop pin 24 penetrates through the supporting element 13 and functions, with the side 22 of the hook 20, as a detent mechanism. The side 22 and the location of the resilient pin 24 relative to the location of the pin 23 determines when the pin 24 will contact and engage the side 22. By properly choosing the shape and dimensions of the side 22 of the hook 20, the resilient pin 24 will frictionally engage the side 22 in the position shown in FIG. 2a and when the supporting element 13 is rotated 180° relative to the position shown in FIG. 2a. In other words, the resilient pin 24 can releasably lock the supporting element 13 in the use and storage positions of the compensating eyeglass attachment. By altering the dimensions of the hook so that the pin 24 securely engages the side 22 of the hook 20 when the supporting element is rotated 90° from the position shown in FIG. 2a, a different storage position from that shown in FIG. 1a can be produced. In that alternative storage location, the compensating lenses 16 are generally perpendicular to the lenses 2. The rotating frame and attaching structure may be made of any suitable materials, such as metals or plastics, although metals may be preferred at least for the lens-supporting elements 13 since metal supporting elements can be bent to adjust the positions of the compensating lenses relative to the near-vision correcting regions 4 of the lenses 2.

Figure 2B:
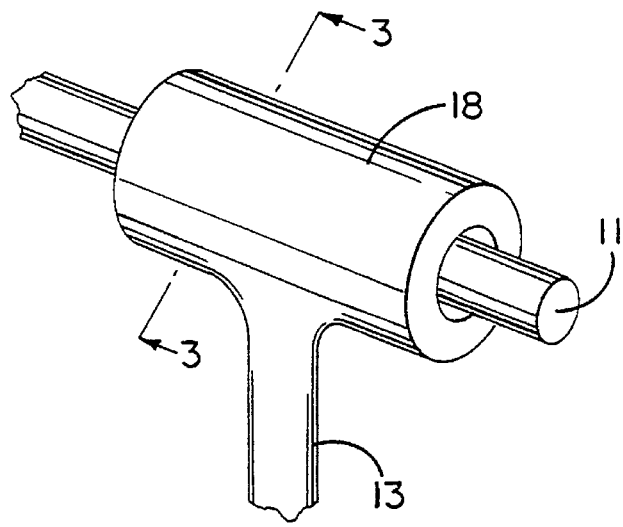
Figure 3A:
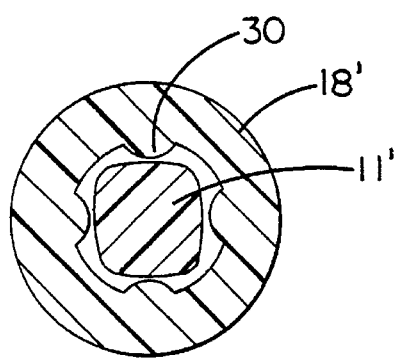
FIGS. 3a and 3b are cross-sectional views taken along line 4—4 of FIG. 2b showing alternative embodiments of detent mechanisms that may be used in the invention.
Figure 3B:
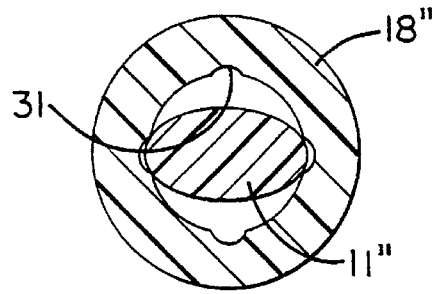

FIGS. 3a and 3b are cross-sectional views of the axle and barrel arrangement of FIG. 2b, taken along line 4—4, showing two alternative retaining, i.e., detent, mechanisms for releasably maintaining the rotatable frame 13 and compensating lenses 16 in the storage and use positions without inadvertent release or undue movement. In the structure shown in FIG. 3a, the inside surface of the barrel 18' includes four projections 30 symmetrically spaced on the inside surface of the barrel 18'. The axle 11', at least within the barrel 18', has a generally square cross-section with rounded corners. The axle 11' and the projections 30 on the inside surface of the barrel 18' are dimensioned, considering their respective resiliencies, so that the axle 11' is retained relatively firmly in the position shown in FIG. 3a but, upon the application of a sufficient torque, can be rotated. During rotation, the rounded corners of the axle 11' and the projections 30 are mutually compressed and, after further rotation, the compression ends so that the arrangement shown in FIG. 3a is restored. The embodiment of FIG. 3a permits the storage and use positions to be 90° apart, for example, a storage position under and adjacent the visor of a hat. If, as in the embodiment of FIGS. 1a and 1b, the storage and use positions are 180° apart, the detent mechanism of FIG. 3a can also be used, although it might be simplified.

FIG. 3b shows an alternative arrangement in which a barrel 18" includes four recesses 31 equally spaced apart on the inside surface of the barrel 18". The axle 11", at least within the barrel 18", is generally elliptical in shape so than the ends of the ellipse can engage an opposed pair of the recesses 31. Again, considering the elasticity and resilience of the materials from which the barrel 18" and axle 11" are made, the dimensions of the recesses 31, the inside surface of the barrel 18", and the elliptical axle 11" are chosen so that the axle can rotate within the barrel in response to a sufficient torque yet "seat" in the recesses to provide the desired releasable retention of the axle 11" in storage and use positions. When the storage and use positions of the compensating lenses 16 are 180° apart, then only a single pair of recesses 31 is required. However, if it is desirable to provide a storage position 90° from the use position, two pairs of recesses 31 are preferably used.

The detent mechanisms of FIGS. 2a, 3a, and 3b are not exclusive. Other means of releasably holding the compensating eyeglass attachment in storage and use positions can be devised and may include springs or other additional members. However, it is desirable that the releasable rotation arrangement be kept as simple and lightweight as possible.

Figure 4A:
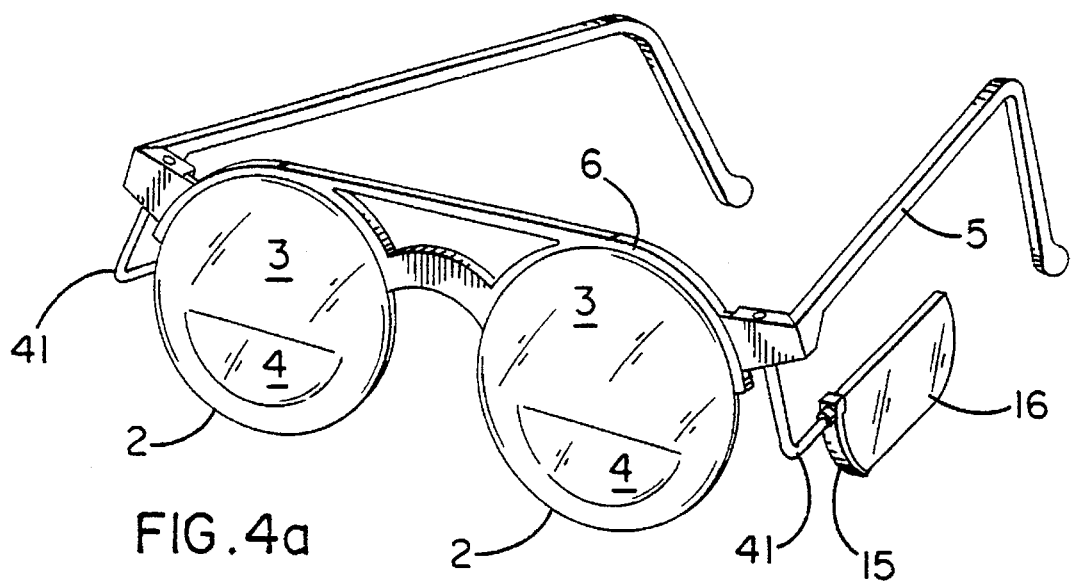
FIGS. 4a and 4b are perspective views showing an alternative embodiment of the invention in storage and use positions, respectively.
Figure 4B:
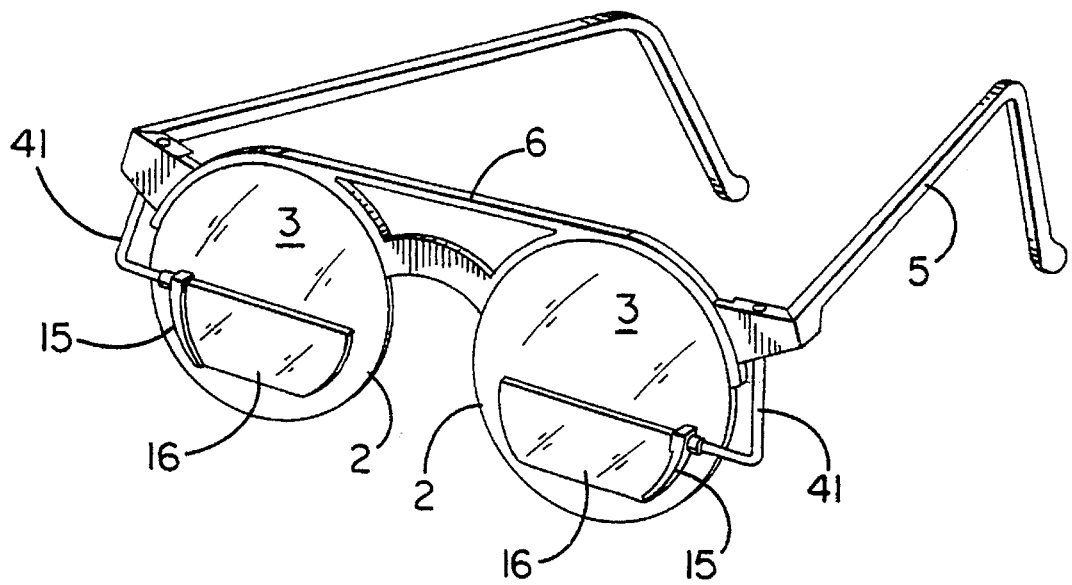

Yet another embodiment of a compensating eyeglass attachment in which the attachment is more permanently fixed to eyeglass frames is illustrated in FIGS. 4a and 4b. As shown there, each compensating lens 16 mounted on a respective compensating lens mounting member 15 is attached by a support 41 to the temple 6 of the eyeglasses 1. The support 41 is mounted rotatingly in the eyeglass frames so that each compensating lens 16 can be brought into a use position opposite the corresponding near-vision region 3 of a lens 2, as shown in FIG. 4b. When near-vision compensation is no longer required, then the compensating lenses 16 can be rotated to a storage position, as illustrated in FIG. 4a. The attachment between the supports 41 and the temple 6 may be a simple journal bearing or may have a more complex structure with a detent mechanism, for example, using the barrel and axle arrangement described above with respect to other embodiments. The support 41 may be plastic or another convenient material. Preferably, the support 41 is a metal wire or other bendable material so that the positioning of the compensating lenses with respect to the near-vision correcting regions and of the lenses 2 can be adjusted as necessary. While the embodiment of FIG. 1a has the advantage of simultaneously moving both lenses between storage and use positions, the storage position of the embodiment of FIGS. 4a and 4b may be more convenient in some instances than the storage position of the embodiment of FIG. 1a, even though an additional pair of eyeglasses may be required. The embodiment of FIGS. 4a and 4b preferably include a permanent attachment of the compensating lens support 41 to the eyeglass temple. The attachment may be made by drilling a hole in the frames and inserting, with an adhesive, if necessary, a barrel receiving the rotatable support 41. Alternatively, the support 41 might simply be inserted in the hole provided an end of the support is flattened or a retaining element is fitted on the support, such as a nut, to avoid unintentional withdrawal of the support 41. Similar embodiments functioning as shown in FIGS. 4a and 4b including clips or hooks that respectively attach a single compensating lens at a side of the eyeglass frames also could be made.

While the invention has been particularly described with respect to bifocals, it is equally applicable to multi-focus lenses of greater complexity such as trifocals and to graded bifocals so long as the correction of the compensating lens, in combination with the near-vision correction, provides the distant-vision correction. In some instances, only a single compensating lens may be provided for a pair of correcting lenses 2 with the other lens either missing or replaced by a non-correcting lens if monocular distance vision is sufficient for a particular activity.

The invention has been described with respect to certain preferred embodiments. Various additions and modifications within the spirit of the invention will appear to those of skill in the art from the foregoing description. Accordingly, the scope of the invention is limited solely by the following claims.

I claim:

1. An attachment for bifocal eyeglasses including at least one eyeglass lens having a first correcting region providing corrected distant-vision and a second correcting region providing corrected near-vision, the attachment comprising:

a compensating lens sized and shaped for covering the second correcting region of the eyeglass lens without substantially covering the first correcting region of the eyeglass lens and providing optical compensation for the second correcting region so that corrected distant-vision is provided over substantially all of the first and second correcting regions of the eyeglass lens; and attachment means for attaching the compensating lens to the eyeglasses.

2. The attachment of claim 1 wherein the attachment means comprises at least one hook for engaging frames of the eyeglasses.

3. The attachment of claim 2 wherein the hook includes a hinge for rotating the compensating lens between a use position directly opposite the second correcting region and a storage position remote from the eyeglass lens.

4. The attachment of claim 3 wherein the hinge includes a detent for releasably retaining the compensating lens in the use and storage positions.

5. The attachment of claim 3 wherein the hook includes a clevis and the hinge includes a support hingedly connected to the clevis and supporting the compensating lens.

6. The attachment of claim 5 wherein the hinge includes a detent for releasably retaining the compensating lens in the use and storage positions.

7. The attachment of claim 6 wherein the detent comprises a resilient pin extending from the compensating lens support for engaging the clevis.

8. The attachment of claim 3 wherein the hinge comprises an axle, a barrel rotatingly engaging the axle, and a support extending from one of the barrel and the axle to the compensating lens.

9. The attachment of claim 8 wherein the hinge includes a detent for releasably retaining the compensating lens in the use and storage positions.

10. The attachment of claim 9 wherein the detent includes one of protrusions and recesses on the barrel for releasably restraining rotation of the axle relative to the barrel.

11. The attachment of claim 8 wherein the support is bendable for aligning the compensating lens directly opposite the second correcting region of the eyeglass lens.

12. The attachment of claim 1 wherein the attachment means includes a support extending to the compensating lens.

13. The attachment of claim 12 wherein the support is bendable for aligning the compensating lens directly opposite the second correcting region of the eyeglass lens.

14. The attachment of claim 1 wherein the attachment means comprises a support rotatably attached to frames of the eyeglasses and supporting the compensating lens for moving the compensating lens between the use position directly opposite the second correcting region of the eyeglass lens and a storage position remote from the eyeglass lens.

15. The attachment of claim 14 wherein the support is bendable for aligning the compensating lens directly opposite the second correcting region of the eyeglass lens.

16. The attachment of claim 1 wherein the eyeglasses include two eyeglass lenses, each eyeglass lens having respective first and second correcting regions and the attachment comprises two compensating lenses, each lens for covering a corresponding second correcting region of the eyeglass lenses so that corrected distance vision is provided over substantially all of each of the eyeglass lenses.

* * * * *